000
United States Patent [19]

Sato

[11] Patent Number: 4,961,136
[45] Date of Patent: Oct. 2, 1990

[54] MICROPROCESSOR SYSTEM HAVING CACHE DIRECTORY AND CACHE MEMORY AND HARDWARE FOR INITIALIZING THE DIRECTORY

[75] Inventor: Kazuyuki Sato, Tokyo, Japan

[73] Assignee: Kabushiki Kaisha Toshiba, Kawasaki, Japan

[21] Appl. No.: 443,842

[22] Filed: Dec. 4, 1989

Related U.S. Application Data

[63] Continuation of Ser. No. 114,010, Oct. 29, 1987, abandoned.

[30] Foreign Application Priority Data

Nov. 6, 1986 [JP] Japan .............................. 61-264402

[51] Int. Cl.$^5$ ...................... G06F 9/445; G06F 12/00
[52] U.S. Cl. ................................ 364/200; 364/280.2; 364/243.41; 364/242.92
[58] Field of Search ... 364/200 MS File, 900 MS File

[56] References Cited

U.S. PATENT DOCUMENTS

| | | | |
|---|---|---|---|
| 3,710,324 | 1/1973 | Cohen et al. | 364/200 |
| 4,195,341 | 3/1980 | Joyce et al. | 364/200 |
| 4,493,026 | 1/1985 | Olnowich | 364/200 |
| 4,575,792 | 3/1986 | Keeley . | |

Primary Examiner—Eddie P. Chan
Attorney, Agent, or Firm—Finnegan, Henderson, Farabow, Garrett, and Dunner

[57] ABSTRACT

A microprocessor includes an initializing section for generating a reset signal, in response to an input reset instruction. A controller outputs a bus acquisition request to the microprocessor, in response to the reset signal output from the initializing section. The microprocessor is reset in response to the reset signal output from the initializing section, and generates a bus acquisition acknowledge in accordance with the bus acquisition request output from the controller, thereby releasing a bus and holding an operation state. The controller initializes a cache directory, using the bus which is released in accordance with the bus acquisition acknowledge from the microprocessor.

14 Claims, 2 Drawing Sheets

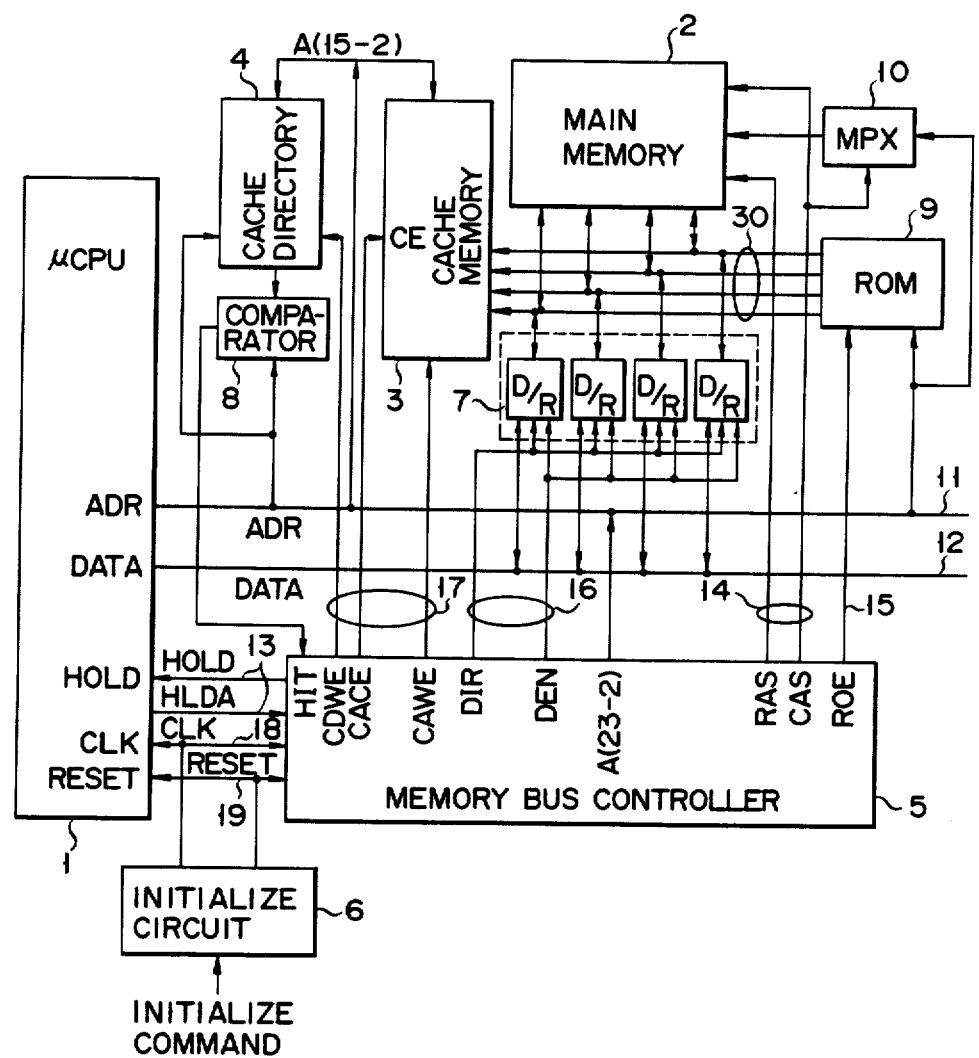
F I G. 1

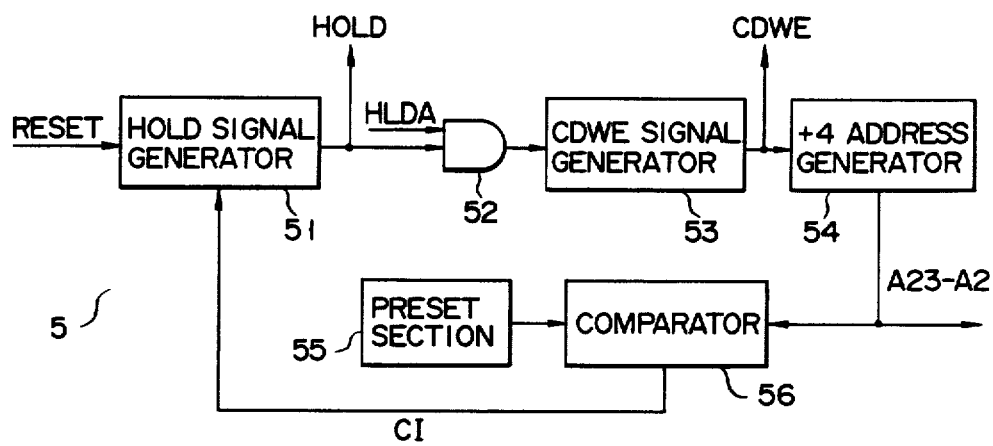
F I G. 2
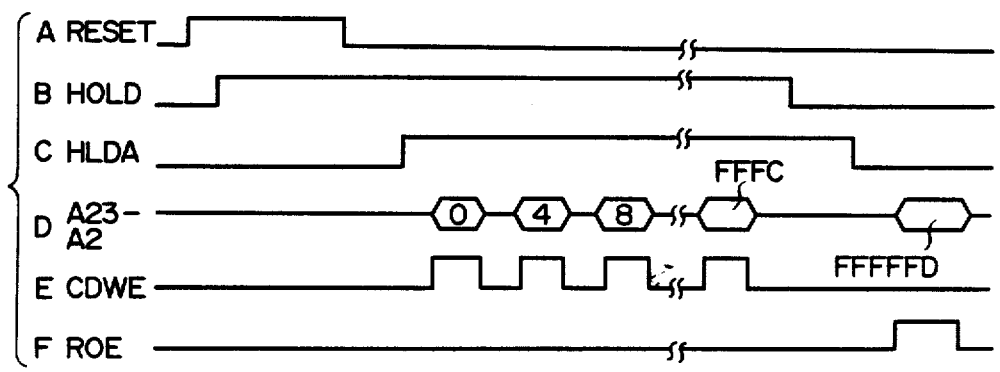
F I G. 3

MICROPROCESSOR SYSTEM HAVING CACHE DIRECTORY AND CACHE MEMORY AND HARDWARE FOR INITIALIZING THE DIRECTORY

This application is a continuation of application Ser. No. 114.010, filed Oct. 29, 1987, now abandoned.

BACKGROUND OF THE INVENTION

The present invention relates to a microprocessor system having a cache directory and a cache memory and, more particularly, to a microprocessor system in which the cache directory is initialized not by software but by hardware.

In recent times, the increase in the processing speed of microprocessors has given rise to strong demand for a corresponding increase in the memory-access speed. If the memory-access speed is not sufficiently increased, it then becomes the determining factor as regards the processing speed of the entire microprocessor system. A conventional solution to this problem is to use a cache memory. In this case, however, the cache directory must be initialized before it can be used.

Conventionally, in a microprocessor system incorporating a microprocessor which does not include a cache memory control section, the cache directory is initialized by means of software. However, when software is used to initialize the cache directory, compatibility between programs cannot be achieved, since an existing program will not normally include this software. For this reason, there is now considerable demand for a microprocessor system which can initialize the cache directory by means of hardware, before a program is executed.

SUMMARY OF THE INVENTION

The present invention has been developed in consideration of the above situation, and has as its object to provide a microprocessor system which is capable of initializing a cache directory by means of hardware, before a program is executed. The microprocessor according to the present invention comprises: an initializing section for generating a reset signal, in response to an input reset instruction; a microprocessor, which is reset in response to the reset signal output from the initializing section, for generating a bus acquisition acknowledge in accordance with an input bus acquisition request, thereby releasing a bus and maintaining a given operation state; and a controller for outputting the bus acquisition request to the microprocessor, in response to the reset signal output from the initializing section, and initializing the cache directory, using the bus which is released in accordance with the bus acquisition acknowledge from the microprocessor.

As is described above, according to the microprocessor system having the cache memory of the present invention, the directory is initialized not by software but by hardware, before a program is executed, thereby eliminating the problem of compatibility between programs.

BRIEF DESCRIPTION OF THE DRAWINGS

FIG. 1 is a block diagram showing the arrangement of an embodiment of a microprocessor system having a cache directory and a cache memory according to the present invention;

FIG. 2 is a block diagram showing part of the memory bus controller, shown in FIG. 1, as used in the present invention; and FIGS. 3A to 3F are timing charts for explaining the operation of the embodiment.

DETAILED DESCRIPTION OF THE PREFERRED EMBODIMENT

A microprocessor system having a cache directory and a cache memory according to the present invention will now be described in detail, with reference to the accompanying drawings.

The arrangement of an embodiment of the present invention will be described first, with reference to FIG. 1.

Address bus ADR and data bus DATA are connected to microprocessor 1 (to be hereinafter referred to as the $\mu$CPU) which operates in accordance with clock CLK output from initialize circuit 6. When $\mu$CPU 1 receives a RESET signal from circuit 6 and is reset, it fetches a first instruction from a predetermined address—such as an address "FFFFF0" of ROM 9, for example—and executes it. When $\mu$CPU 1 receives bus acquisition request HOLD from memory bus controller 5, it outputs bus acquisition acknowledge HLDA to controller 5, thereby releasing address and data buses ADR and DATA. The $\mu$CPU holds this state while request HOLD is input.

Addresses A15 to A02 on bus ADR are supplied to cache directory 4. When control signal CDWE from controller 5 is inactive, directory data is read out from directory 4. At the same time, addresses A23 to A16 on bus ADR are supplied to comparator 8. When the directory data and addresses A23 to A16 coincide with each other, cache hit signal HIT is output to controller 5. If control signal CDWE from controller 5 is active, addresses A23 to A16 are written as the directory data in a location designated by addresses A15 to A02.

Addresses A15 to A02 are also supplied to cache memory 3. In this case, cache data is accessed in accordance with control signals CACE and CAWE output from controller 5. That is, if signal CAWE is inactive and signal CACE is active, the cache data is read out from addresses A15 to A02 of memory 3 onto data bus 30. If both of signals CAWE and CACE are active, data on bus 30 is written as the cache data in addresses A15 to A02 of memory 3.

Accessing of main memory 2 is controlled in accordance with control signals RAS and CAS output from controller 5. An address on bus ADR is supplied to memory 2 via multiplexer (MPX) 10 which is controlled by signal CAS. The readout data is supplied onto bus 30 from memory 2 in a read operation, and the data on bus 30 is written in memory 2 in a write operation.

ROM 9 stores an OS (Operating System) including an initial program. ROM 9 receives an address from bus ADR and outputs an instruction onto bus 30, in accordance with control signal ROE.

Driver group 7 exchanges data between buses 30 and 12, in accordance with control signals DIR and DEN from controller 5. That is, group 7 is enabled by signal DEN, and the direction of data transfer is designated by signal DIR.

As has been described above, memory bus controller 5 outputs a variety of control signals to the respective sections, in accordance with clock CLK output from circuit 6. FIG. 2 shows in detail part of controller 5 as used in the present invention.

When signal RESET is input from initialize circuit 6, to hold signal generator 51, generator 51 outputs bus acquisition requests HOLD to μCPU 1 and AND gate 52. Two-input AND gate 52 also receives bus acquisition acknowledge HLDA from μCPU 1. CDWE signal generator 53 generates control signal CDWE, in accordance with an output from gate 52. Signal CDWE is output to +4 address generator 54.

Generator 54 outputs an address, which is updated in response to signal CDWE, onto address bus ADR and then increments the address by 4 before next signal CDWE is input. When the first signal CDWE is input, an initial value "0" is output. An address "00FFFC" is preset in preset section 55 and is supplied to comparator 56. An address output from generator 54 is also supplied to comparator 56. When the two addresses coincide with each other, comparator 56 outputs coincidence signal CI for resetting signal generator 51, after directory data is written into directory 4. Therefore, request HOLD output from generator 51 is reset and hence acknowledge HLDA is reset.

The operation of the above embodiment will be described below.

An initialize instruction is input to initialize circuit 6. This initialize instruction may be generated by power-on reset or may be generated as a result of manipulation of a reset button by a user. Circuit 6 outputs signal RESET, shown in FIG. 3A, to μCPU 1 and controller 5.

The μCPU is reset in accordance with signal RESET and begins to fetch an instruction stored in a predetermined address, in this case, an address "FFFFF0" of ROM 9. Thus hold signal generator 51 of controller 5 outputs bus acquisition request HOLD to μCPU 1, as is shown in FIG. 3B, while signal RESET is input into μCPU 1. Request HOLD remains active until coincidence signal CI is input. When request HOLD is input into μCPU 1, μCPU 1 releases the bus and outputs bus acquisition acknowledge HLDA to AND gate 52 of controller 5, as is shown in FIG. 3C. Acknowledge HLDA remains active until request HOLD becomes inactive. Thereafter, μCPU 1 holds this state and executes only internal processing until request HOLD is cancelled.

An output from gate 52 becomes active when both request HOLD and acknowledge HLDA are active. While the output from gate 52 remains active, control signals CDWE are sequentially generated from CDWE signal generator 53 and output to cache directory 4, as is shown in FIG. 3E. In addition, as is shown in FIG. 3D, +4 address generator 54 sequentially generates addresses A23 to A02 onto the address bus, in synchronism with signals CDWE output from generator 53. In this case, the address which is output first is "000000", and each of the following addresses is incremented by 4. Generator 54 updates an address, before next signal CDWE is input thereto, after it outputs an address.

In accordance with signal CDWE, directory 4 stores address A23 to A16 of address A23 to A02 input from the address bus, as directory data, in address A15 to A02 thereof, as directory address. That is, all the directory data become "00".

An address "00FFFC" has been supplied from preset section 55 to comparator 56. When addresses and signals CDWE are sequentially output and a generated address becomes "00FFFC", coincidence signal CI is generated by comparator 56, after the generated address is written as directory data in directory 4. Then, signal CI is output to generator 51. As a result, generator 51 is reset, and request HOLD becomes inactive, as is shown in FIG. 3B.

Since request HOLD becomes inactive, μCPU 1 makes acknowledge HLDA inactive, as is shown in FIG. 3C. Thereafter, μCPU 1 starts initialize processing, which is instructed by signal RESET. That is, the address "FFFFF0" is output from μCPU 1, and at the same time, control signal ROE is output from controller 5, thereby accessing ROM 9. Thus, the first instruction is fetched by μCPU 1. At this time, since the data of directory 4 is "00", a cache hit does not occur.

What is claimed is:

1. A microprocessor system having a cache directory and a cache memory, comprising:
    initializing means for generating a reset signal, in response to an input reset instruction;
    an address bus coupled to an address input of said cache directory;
    a microprocessor, coupled to said address bus and reset in response to said reset signal output from said initializing means, for generating a bus acquisition acknowledge signal in response to a bus acquisition request signal applied thereto, said microprocessor releasing said address bus and holding an operation state upon generating said bus acquisition acknowledge signal;
    request generating means for outputting said bus acquisition request signal to said microprocessor, in response to said reset signal output from said initializing means, before said reset signal becomes inactive;
    write control signal generating means, coupled to receive said bus acquisition acknowledge signal, for sequentially generating write control signals while said bus acquisition acknowledge signal is active, in accordance with said bus acquisition request signal; and
    address generating means for sequentially outputting addresses, in accordance with said write control signals, until said address becomes a predetermined address, each of said addresses including a first address portion and a second address portion, said address generating means being coupled to output said first and second address portions onto said address bus, said write control signal being applied to said cache directory to control an operation of writing said first address portion as predetermined directory data in said cache directory at a directory address designated by said second address portion and thereby initializing said cache directory, said outputted address being updated by a predetermined value every time said address is output to said cache directory, before a next write control signal is generated.

2. The system according to claim 1, wherein said request generating means outputs the bus acquisition request signal to said microprocessor while the reset signal is output from said initializing means.

3. The system according to claim 1, wherein said request generating means continues to output the bus acquisition request signal until initialization of said cache directory is completed, and said microprocessor continues to output the bus acquisition acknowledge signal, in response to the bus acquisition request signal.

4. The system according to claim 1, wherein the predetermined value is the number of bytes which constitute one word.

5. The system according to claim 1, wherein an initial value set in said address generating means is "0", and the predetermined directory data is "00".

6. The system according to claim 1, wherein said request generating means, said write control signal generating means, and said address generating means comprise a gate array.

7. A microprocessor system, comprising:
an address bus;
a cache directory connected to said address bus;
a microprocessor, connected to said address bus, that is reset in response to an input reset signal and that generates a bus acquisition acknowledge signal in response to an input bus acquisition request signal to release said address bus;
initializing means for generating and outputting said rest signal to said microprocessor in response to an input reset instruction;
write means, connected to said initializing means to receive said reset signal, for generating and outputting said bus acquisition request signal to said microprocessor in response to said reset signal and for receiving said bus acquisition signal from the microprocessor to sequentially generate addresses onto said address bus in response to acquisition of said address bus, wherein each of said addresses comprises first and second portions, said write means further including means, responsive to an active state of said bus acquisition acknowledge signal, for writing said first portion as predetermined directory data into said cache directory at an address designated by said second portion and for releasing said address bus in response to completion of the writing operation, thereby resetting said cache directory.

8. A system according to claim 7, wherein said write means includes means for outputting said bus acquisition request signal to the microprocessor during a dwelling time of said reset signal.

9. A system according to claim 7, wherein said reset instruction is generated when power to the microprocessor system is turned on.

10. A system according to claim 7, wherein said reset instruction is generated by operation of a reset button.

11. A method for initializing a cache directory in a microprocessor system having a microprocessor, a cache memory and the cache directory, comprising the steps of:
generating a reset signal in response to a reset instruction;
generating a bus acquisition request in response to said reset signal;
holding an operation state of said microprocessor in response to the bus acquisition request;
generating a bus acquisition acknowledge signal in response to said bus acquisition request to release an address bus;
sequentially generating addresses in response to said bus acquisition acknowledge signal indicating the acquisition of said address bus, each of said addresses comprising first and second portions;
writing said first portion as predetermined directory data in the cache directory at an address designated by said second portion using said address bus when said bus acquisition acknowledge signal is active; and
releasing said address bus in response to completion of said writing step.

12. A method according to claim 11, wherein said writing step includes outputting said bus acquisition request to said microprocessor during a dwelling time of said reset signal.

13. A method according to claim 11, wherein said reset instruction is generated when power to said microprocessor system is turned on.

14. A method according to claim 11, wherein said reset instruction is generated by operation of a reset button.

* * * * *